US012729090B2

(12) United States Patent
Huang

(10) Patent No.: US 12,729,090 B2
(45) Date of Patent: Sep. 8, 2026

(54) AUTOMATIC SLITTING MACHINE AND WORKING METHOD THEREOF

(71) Applicant: Kingnode America Inc., Atlanta, GA (US)

(72) Inventor: Benyu Huang, Ningde (CN)

(73) Assignee: Kingnode America Inc., Atlanta, GA (US)

( * ) Notice: Subject to any disclaimer, the term of this patent is extended or adjusted under 35 U.S.C. 154(b) by 70 days.

(21) Appl. No.: 19/032,376

(22) Filed: Jan. 20, 2025

(65) Prior Publication Data

US 2026/0208996 A1 Jul. 23, 2026

(51) Int. Cl.

| | |
|---|---|
| ***B65H 35/02*** | (2006.01) |
| ***B26D 1/24*** | (2006.01) |
| ***B26D 7/26*** | (2006.01) |
| ***B65H 16/02*** | (2006.01) |
| ***B65H 16/10*** | (2006.01) |
| ***B65H 18/02*** | (2006.01) |
| ***B65H 18/04*** | (2006.01) |

(52) U.S. Cl.

CPC ............. *B65H 35/02* (2013.01); *B26D 1/245* (2013.01); *B26D 7/265* (2013.01); *B65H 16/02* (2013.01); *B65H 16/103* (2013.01); *B65H 18/021* (2013.01); *B65H 18/025* (2013.01); *B65H 18/04* (2013.01); *B65H 2301/41306* (2013.01); *B65H 2301/41372* (2013.01); *B65H 2301/4139* (2013.01); *B65H 2301/41485* (2013.01); *B65H 2301/511* (2013.01); *B65H 2301/5155* (2013.01); *B65H 2402/52* (2013.01); *B65H 2403/30* (2013.01); *B65H 2403/80* (2013.01)

(58) Field of Classification Search

None

See application file for complete search history.

(56) References Cited

U.S. PATENT DOCUMENTS

| | | | | |
|---|---|---|---|---|
| 3,173,326 A * | 3/1965 | Gulliksen ................ | D06H 7/04 | 83/507 |
| 3,276,475 A * | 10/1966 | Kinker .................. | B26D 11/00 | 137/625.3 |

(Continued)

FOREIGN PATENT DOCUMENTS

| | | |
|---|---|---|
| CN | 204934729 U | 1/2016 |
| CN | 218504584 U | 2/2023 |
| CN | 116594329 A | 8/2023 |

*Primary Examiner* — William A. Rivera

(74) *Attorney, Agent, or Firm* — George D. Morgan

(57) ABSTRACT

The invention provides an automatic slitting machine and a working method thereof, wherein the automatic slitting machine includes a machine frame, an unwinding device, a slitting device, a shaft return device, a transmission device and a winding device. The unwinding device pulls the adhesive paper in the parent roll to the slitting region, so that the slitting device cuts the adhesive paper pulled out from the parent roll to form a plurality of narrow-width adhesive papers, and then winds the adhesive paper to form a required paper roll adhesive tape. The winding shaft is pushed out to remove the paper roll adhesive tape, and then the winding shaft is placed on the shaft return frame. The shaft return device can automatically and successively transfer each winding shaft to the slitting region. It can save the labor cost and improve the working efficiency of the adhesive tape production.

10 Claims, 16 Drawing Sheets

(56) References Cited

U.S. PATENT DOCUMENTS

| | | | | |
|---|---|---|---|---|
| 2001/0052279 | A1* | 12/2001 | Sanda | B26D 1/0006<br>83/676 |
| 2009/0151533 | A1* | 6/2009 | Lan | B26D 5/00<br>83/663 |
| 2012/0024123 | A1* | 2/2012 | Nakajima | B65H 18/10<br>83/102 |
| 2018/0222712 | A1* | 8/2018 | Lee | B65H 18/103 |
| 2018/0272402 | A1* | 9/2018 | Nishimura | B26D 7/14 |
| 2022/0168916 | A1* | 6/2022 | Nakamura | B26D 1/245 |
| 2024/0293949 | A1* | 9/2024 | Nadachi | B31B 50/624 |

* cited by examiner

AUTOMATIC SLITTING MACHINE AND WORKING METHOD THEREOF

TECHNICAL FIELD

The present invention relates to the field of adhesive tape processing equipment, and more particularly to an automatic slitting machine and a working method thereof.

BACKGROUND

In the adhesive tape processing equipment, the slitting machine usually cuts wide-width adhesive tapes in the parent roll by the slitting device to form a plurality of narrow-width adhesive tapes, and then winds and collects the formed adhesive tapes by the winder to form the required whole roll of adhesive tape.

However, the current adhesive tape processing equipment has a low degree of automation. For example, it is impossible to automatically put a winding shaft into the equipment. After removing the whole roll of adhesive tape on the winding shaft, it is also necessary to manually put the adhesive tape into the equipment for taking-up the adhesive tape, which is troublesome.

SUMMARY

To address the above-discussed deficiencies of the background art, the present invention provides an automatic slitting machine and a working method thereof.

The invention is realized by the following technical solution.

In a First Aspect, the Present Invention Discloses an Automatic Slitting Machine. The Slitting Machine Includes a Machine Frame, an Unwinding Device, a Slitting Device, a Shaft Return Device, a Transmission Device and a Winding Device;

- wherein the unwinding device includes an unwinding frame and an unwinding shaft; the unwinding shaft is mounted on the unwinding frame, and the unwinding shaft is configured for mounting a parent roll; the rotation of the unwinding shaft drives the parent roll to release adhesive paper;
- the slitting device includes an upper circular cutter and a lower circular cutter; one side of the machine frame is a slitting region, the upper circular cutter and the lower circular cutter are both provided in the slitting region; the upper circular cutter sheathes and fixes a plurality of slitting cutters; the slitting cutters are tangent to the lower circular cutter, and the adhesive paper passes between the slitting cutter and the lower circular cutter;
- the shaft return device includes a transverse moving seat, a shaft return chain, a guide rod and a push plate, wherein one side of the machine frame is a shaft release region; the transverse moving seat moves linearly with respect to the shaft release region and the slitting region; the shaft return chain moving synchronously and in the same direction is provided at both sides of the shaft release region; an edge of the transverse moving seat is engaged with the shaft return chain, and the height of the transverse moving seat is lower than an upper part of the shaft return chain; a limiting member is fixed in the shaft return chain by several links; two ends of a winding shaft are respectively placed between two adjacent limiting members corresponding to two of the shaft return chains, moving the winding shaft to the transverse moving seat with the running of the shaft return chain; the guide rods are fixed on both sides of the slitting region; the guide rod is provided in an inclined manner, and the upper end of the guide rod is engaged with the edge of the transverse moving seat; the lower end of the guide rod is recessed downwards to form a limiting groove; the winding shaft in the transverse moving seat sliding down the guide rod to the rotating shaft at the two ends thereof is respectively caught in the limiting groove of the two guide rods, and the push plate moves relative to the limiting groove to push out the winding shaft located in the limiting groove;
- the transmission device includes a moving seat and a driving shaft; the driving shaft is connected to the moving seat, and the driving shaft rotates relative to the moving seat; a spline hole is provided on the axis of the driving shaft; the moving seat is located on a side edge of the slitting region and moves relative to the guide rod, and moves until the spline hole is fitted outside a first spline at an end of the winding shaft;
- the winding device includes a flat insert plate, a breaking blade and an inclined insert plate, wherein the flat insert plate is close to a lower end of the guide rod, and the flat insert plate moves horizontally above the limiting groove; the breaking blade is located above the flat insert plate after being reset, and the breaking blade moves vertically and parallelly to the flat insert plate; the inclined insert plate is provided obliquely above the limiting groove; and the inclined insert plate moves along an inclination angle thereof relative to the limiting groove.

In a possible implementation of the first aspect, the winding device further includes a water spraying mechanism and a doubling roller; two of the doubling rollers are provided at the ends of the slitting region; two ends of the two doubling rollers are limited to rotate relative to the machine frame, and a winding shaft after bearing and winding the adhesive paper is located between the two doubling rollers; the water spraying mechanism includes a cross rod and a row of spray heads provided on the cross rod; the spray nozzles of the spray heads face downwards; and the cross rod is provided between the doubling roller and the limiting groove, and the cross rod moves vertically relative to the machine frame.

In a possible implementation of the first aspect, a rotatable rotary sleeve is connected to both ends of the unwinding shaft; both sides of the unwinding frame of the unwinding device are provided with a mounting groove, and the unwinding frame is provided with a retractable stop pin at a rabbet of the mounting groove; the stop pin extends into the rabbet of the mounting groove to stop the rotary sleeve at the end of the unwinding shaft in the mounting groove after the both ends of the unwinding shaft are respectively placed in two of the mounting grooves.

In a possible implementation of the first aspect, a first gear driven by a motor is provided outside one side of the unwinding frame; a second gear is fixed to one end of the unwinding shaft; and the second gear is meshed with the first gear after the unwinding shaft penetrates into the mounting groove.

In a possible implementation of the first aspect, the unwinding frame further includes a lifting shaft rod and a lifting shaft air cylinder; the lifting shaft rod and the lifting shaft air cylinder are provided at both sides of the unwinding frame; a lower end of the lifting shaft rod is connected to swing under the unwinding frame; a lifting shaft groove is provided at one side of an upper end of the lifting shaft rod facing inside the unwinding frame; the lifting shaft groove is configured for hooking the unwinding shaft; an end of the lifting shaft air cylinder is connected to rotate in the unwinding frame; an end portion of a telescopic rod of the lifting shaft air cylinder and a portion of the lifting shaft rod close to the middle are pivotally connected, making the lifting shaft air cylinder extend and retract to drive the lifting shaft rod to swing up and down; and the lifting shaft air cylinder swings upwards to drive the unwinding shaft hooked by the lifting shaft groove to move upwards to penetrate into the mounting groove.

In a possible implementation of the first aspect, a third gear is fixed at an end of the upper circular cutter; the slitting device further includes a first limiting mechanism including a fixing seat, a transmission shaft and a pressing sleeve; the machine frame fixes the fixing seat on both sides of the slitting region; two ends of the transmission shaft respectively pass through the two of the fixing seats, so that the transmission shaft is limited to rotate below between the two fixing seats, and a fourth gear driven by an electric motor is also fixed at an end of the transmission shaft; a concave arc-shaped groove is provided above the fixing seat, and a detachable pressing sleeve is connected above the fixing seat; both ends of the upper circular cutter are fixed with bearings, and the bearings at the both ends of the upper circular cutter are respectively embedded in the arc-shaped grooves of the two fixing seats; and the pressing sleeve is fixed to the fixing seat to press and fix the bearings at the ends of the upper circular cutter on the arc-shaped grooves, so that the third gear and the fourth gear are meshed.

In a possible implementation of the first aspect, both ends of the lower circular cutter are respectively provided with a positioning portion and a second spline; the slitting device further includes a second limiting mechanism including a placement sleeve, a driving sleeve and a positioning sleeve; the machine frame fixes the placement sleeve on both sides of the slitting region, wherein one of the placement sleeves is embedded with the driving sleeve; a spline groove is provided at an end of the driving sleeve inside the placement sleeve; a motor is in transmission connection with an end of the driving sleeve outside the placement sleeve, the positioning sleeve is connected inside the other of the placement sleeves, and a positioning groove is provided at an end of the positioning sleeve inside the placement sleeve; an end of the placement sleeve facing towards the center of the slitting region is provided with a bearing part which is provided with an arc-shaped placement opening at the axial center of the placement sleeve; two ends of the lower circular cutter are respectively placed at the placement openings of the two placement sleeves, so that the positioning sleeve is moved until the positioning part of one end of the lower circular cutter is sheathed in the positioning groove, and the second spline at the other end of the lower circular cutter is pushed into the spline groove of the driving sleeve.

In a possible implementation of the first aspect, the second limiting mechanism further includes a tensioning sleeve and a tensioning cylinder, wherein the tensioning sleeve is adapted to be embedded in the placement sleeve for telescopic movement; the tensioning sleeve is embedded inside with a bearing; the positioning sleeve penetrates into and is fixed to an inner bearing ring inside the tensioning sleeve; the tensioning cylinder has a piston rod, and the tensioning cylinder is fixed to the outside of the placement sleeve or the machine frame; and an end portion of the piston rod of the tensioning cylinder is fixed to the tensioning sleeve, so that the tensioning cylinder drives the tensioning sleeve to move, and the positioning sleeve drives the lower circular cutter to move.

In a possible implementation of the first aspect, bearing plates are fixed to both ends of the transverse moving seat, the bearing plate is provided with a bearing groove, and a winding shaft enters the bearing groove from the shaft return chain; the transverse moving seat is provided with a pushing member between two of the bearing plates; and the pushing member moves relative to the transverse moving seat to push the winding shaft supported by the bearing groove out to the guide rod.

In a Second Aspect, the Present Invention Also Discloses a Working Method of the Above-Mentioned Slitting Machine, the Working Method being as Follows:

s1, the wide-width adhesive paper in the parent roll of the unwinding device is drawn out into the slitting region of the machine frame and passes between the upper circular cutter and the lower circular cutter of the slitting device;

s2, the slitting cutter of the upper circular cutter in the slitting device slits the wide-width adhesive paper to form a plurality of narrow-width adhesive papers, and the narrow-width adhesive papers are conveyed to the flat insert plate of the winding device and pass under the winding shaft placed on the limiting groove of the guide rod;

s3: the flat insert plate is moved onto the winding shaft, the narrow-width adhesive paper above the flat insert plate is moved back above the winding shaft to wrap the winding shaft; then the flat insert plate is reset, and the inclined insert plate is lowered to be inserted into a gap between the winding shaft and the end of the narrow-width adhesive paper;

s4, the driving shaft is moved until the spline groove is adapted to fit outside the first spline of the winding shaft, so that the driving shaft rotates to drive the winding shaft to rotate, and also, the unwinding shaft also rotates; the unwinding shaft releases the wide-width adhesive paper from the parent roll, and the winding shaft winds the narrow-width adhesive paper on the outside thereof to form a paper roll adhesive tape;

s5, after the winding shaft completes the winding of the narrow-width adhesive paper, the push plate pushes out the winding shaft from the limiting groove of the guide rod;

s6, the winding shaft is taken out for releasing the air pressure in the winding shaft, so as to take out the paper roll adhesive tape after completed winding, and then both ends of the winding shaft are respectively placed on two of the shaft return chains in the shaft release region;

s7, the operation of the shaft return chain drives the winding shaft to move in the direction of the transverse moving seat, so that the winding shaft located at the front end of the shaft return chain moves forwards to fall on the transverse moving seat, then the transverse moving seat moves to the slitting region, and the transverse moving seat then pushes the winding shaft to slide along the guide rod and fall on the limiting groove; and it repeats from the above-mentioned s3 to form a continuous and uninterrupted adhesive paper winding work.

It can be seen from the above description of the structure of the present invention that the present invention has the following advantages over the prior art. The unwinding device in the present invention is used for drawing the adhesive paper in the parent roll into the slitting region, so that the slitting device located in the slitting region cuts the adhesive paper drawn out from the parent roll to form a plurality of narrow-width formed adhesive paper, and then winds the formed adhesive paper on a winding shaft via a winding device to form a required paper roll adhesive tape. The winding shaft is then pushed out to remove the paper roll adhesive tape, and then the winding shaft placed on a two shaft return chain of the unwinding shaft region. The shaft return device can automatically and successively transfer the winding shaft into the slitting region so as to successively carry out the work of winding the adhesive paper. The process of transferring the winding shaft from the unwinding shaft region to the slitting region and winding the adhesive paper does not require manual operation, i.e., there is no need to manually put the winding shaft into the position of the limiting groove of the guide rod. Thus, it is more convenient, and the automatic slitting and automatic winding of the adhesive paper can be achieved, which is beneficial to saving the labor cost of the adhesive tape production and improving the working efficiency.

DETAILED DESCRIPTION OF THE EMBODIMENTS

Figure 1:
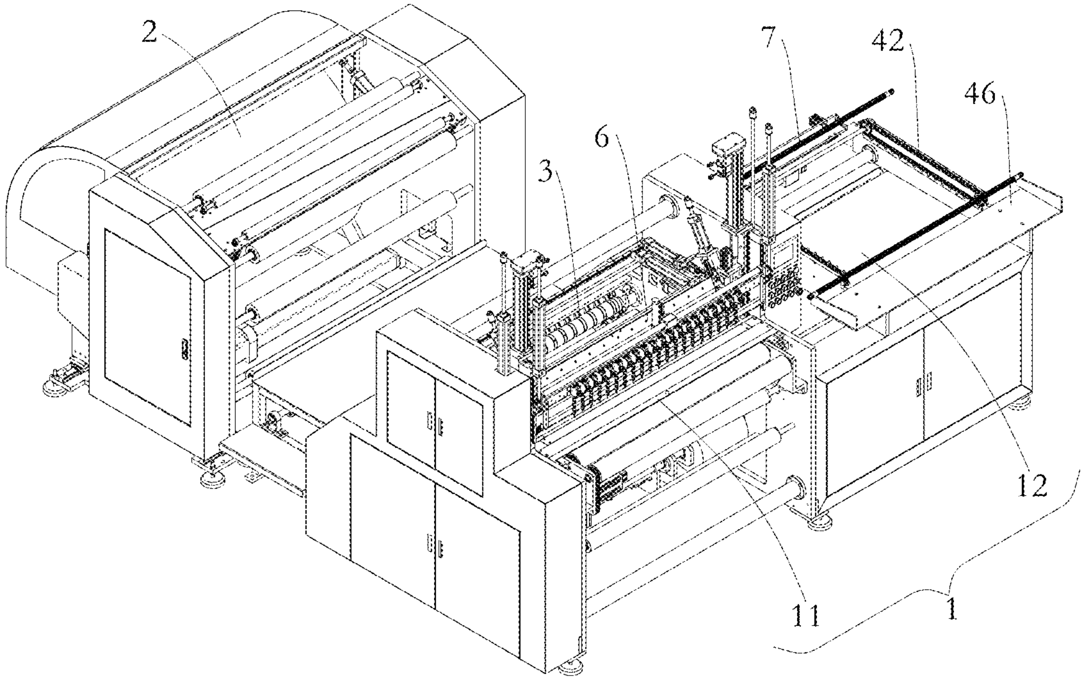
FIG. 1 is a schematic perspective view of the present invention.

For that the objects, aspects and advantages of the disclosure may be more clearly understood, a more particular description of the disclosure may be had by reference to the appended drawings.

Hereinafter, the terms "first", "second" and the like are used for descriptive purposes only and are not to be construed as indicating or implying relative importance or implicitly indicating the number of technical features indicated. Thus, a feature defined by "first", "second" and so on may explicitly or implicitly include one or more such features. In the description of the application, unless otherwise specified, the meaning of "a plurality" is two or more.

Further, in this application, directional terms such as "upper", "lower", and the like are defined with respect to the orientation in which components are schematically illustrated in the drawings. It should be understood that such directional terms are relative terms used for descriptive purposes and clarity and may vary accordingly depending upon the orientation in which the components are illustrated in the drawings.

Figure 4:
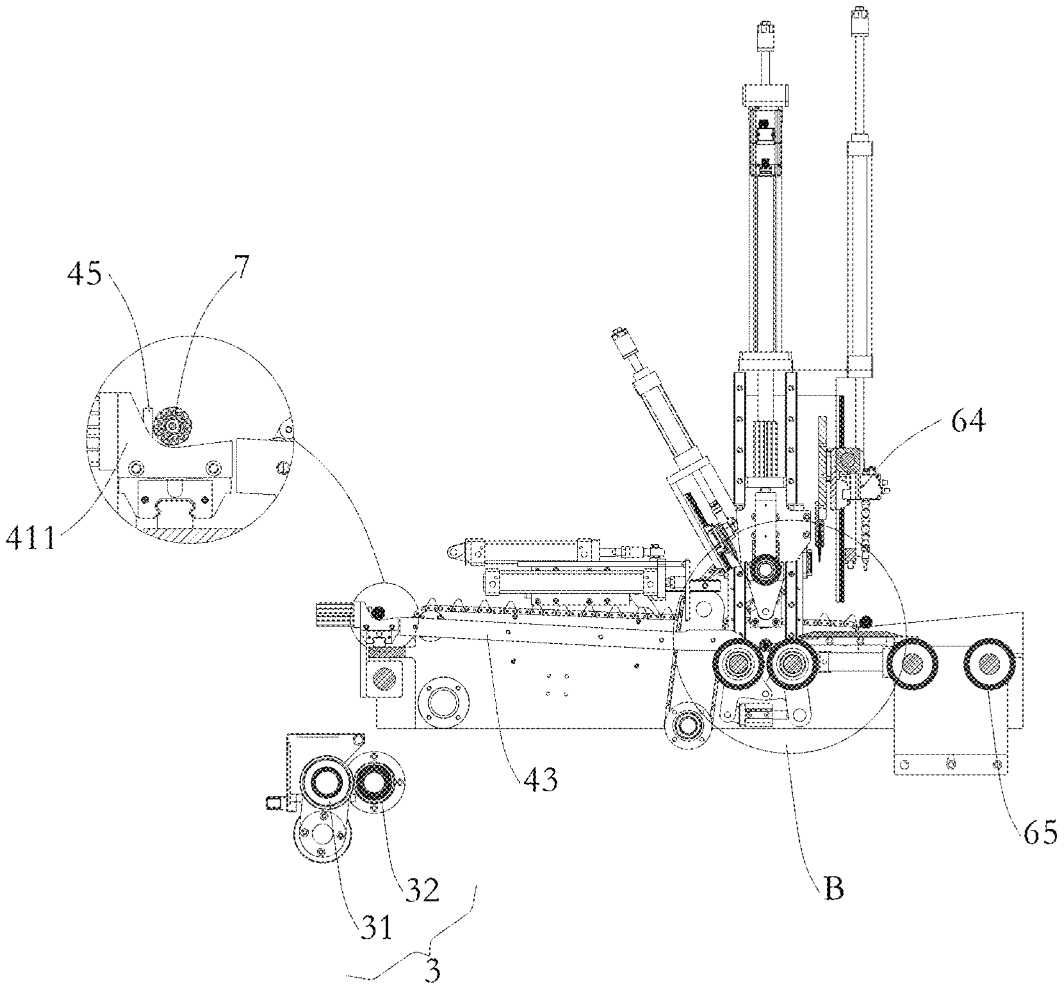
FIG. 4 is a schematic cross-sectional view of the structure above a slitting region of a machine frame.
Figure 5:
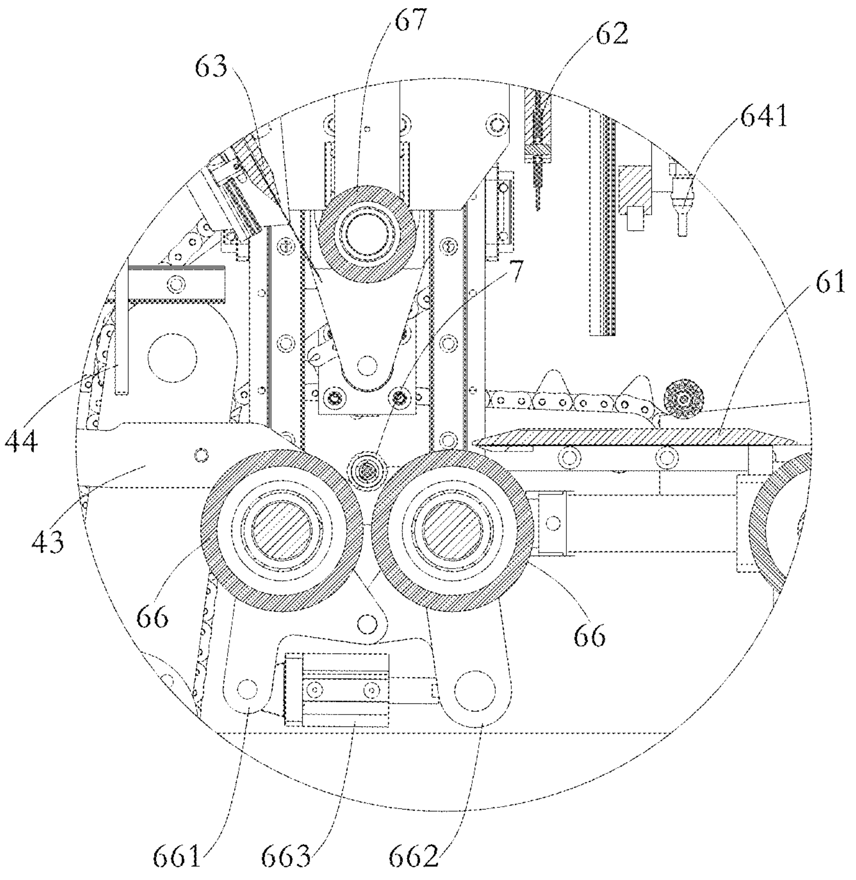
FIG. 5 is an enlarged schematic view at B in FIG. 4.
Figure 6:
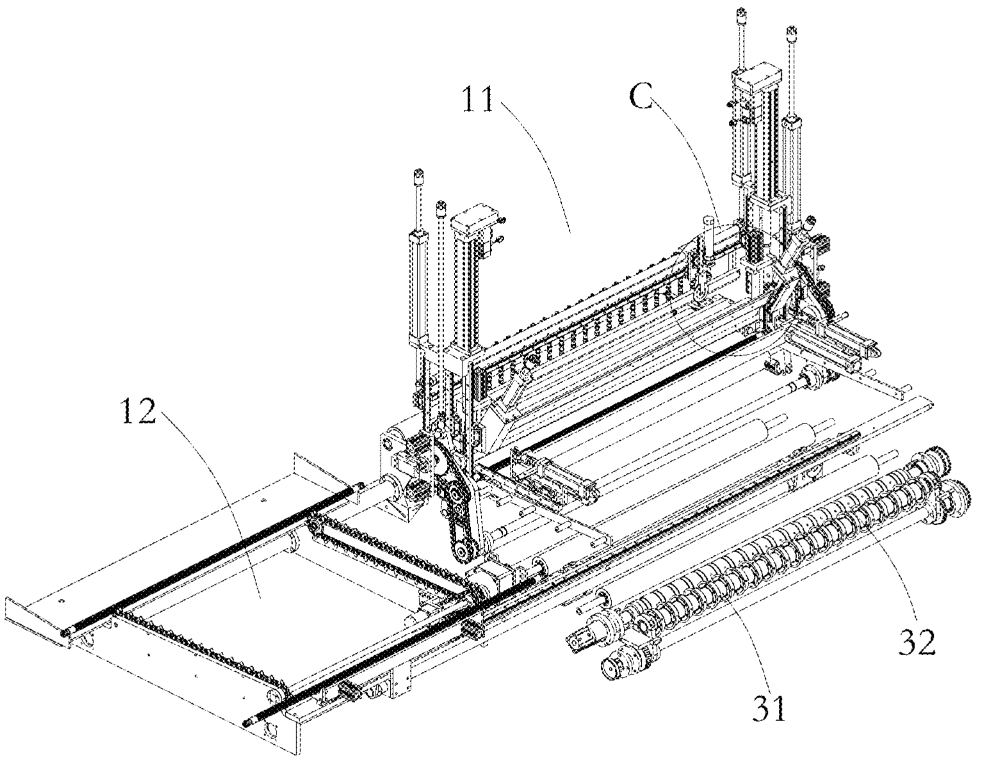
FIG. 6 is a perspective view showing a front end view of the slitting region (the view from an end of the unwinding device).

The invention discloses an automatic slitting machine, as shown in FIGS. 1, 4 and 6, including a frame 1, an unwinding device 2, a slitting device 3, a shaft return device 4, a transmission device 5 and a winding device 6. Here, the unwinding device 2 is configured for mounting the parent roll and releasing the adhesive paper. A slitting region 11 and a shaft release region 12 are respectively located at both sides of the machine frame 1. The slitting device 3, the transmission device 5 and the winding device 6 are provided in the slitting region 11. The shaft return device 4 is provided between the slitting region 11 and the shaft release region 12 for automatically transferring the winding shaft 7 from the shaft release region 12 to the slitting region 11.

The winding shaft 7 may be an air shaft in the prior art. A first spline 71 is fixed at both ends of the winding shaft 7 for connection to the transmission device, so that the transmission device drives the winding shaft 7 to rotate. The end face of the winding shaft 7 is further provided with a one-way air inlet so that an air source is injected into the winding shaft 7 from an end of the winding shaft 7, whereby the surface of the winding shaft 7 expands to convex.

Figure 2:
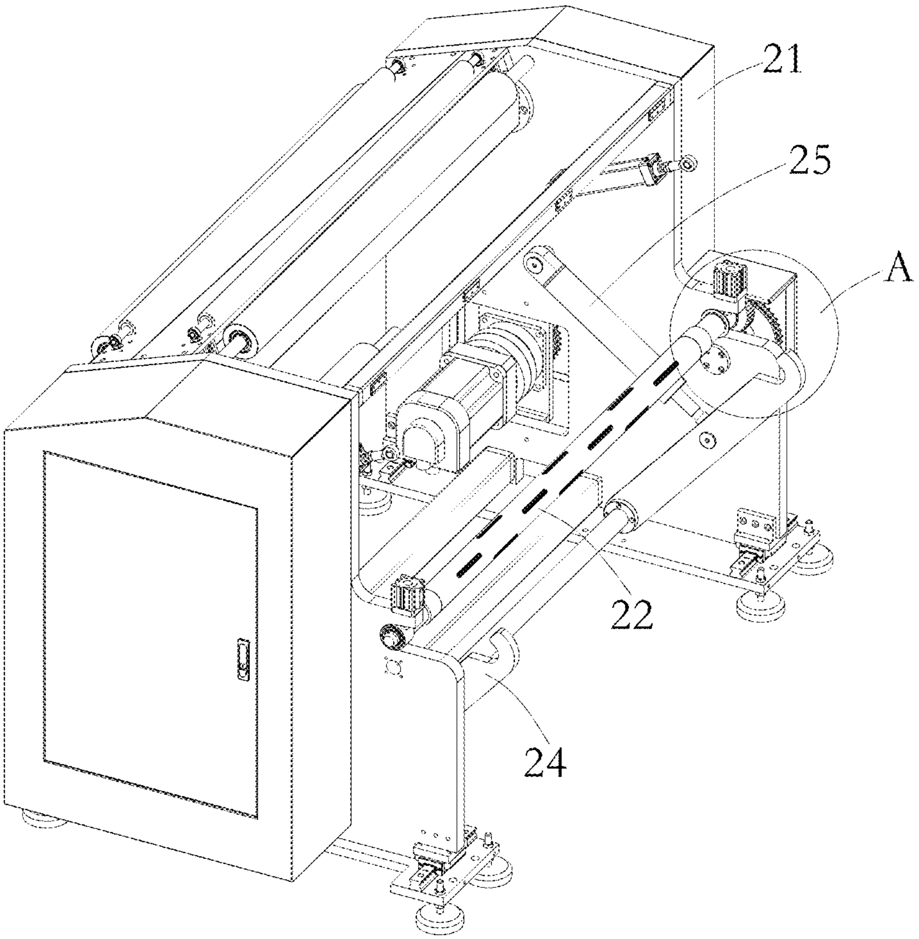
FIG. 2 is a schematic perspective view of an unwinding device with a protective cover hidden.
Figure 3:
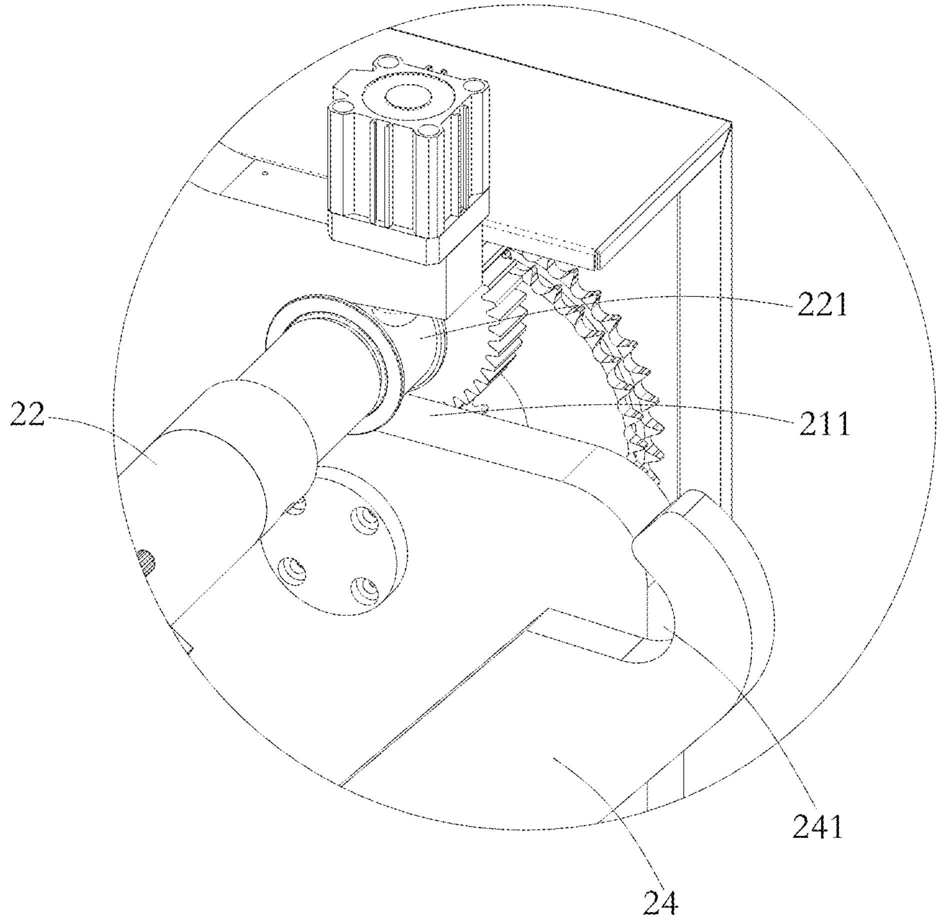
FIG. 3 is an enlarged schematic view at A in FIG. 2.

As shown in FIGS. 2 and 3, the unwinding device 2 includes an unwinding frame 21 and an unwinding shaft 22. Herein, a mounting groove 211 is provided at both sides of the unwinding frame 21, and the unwinding frame 21 is provided with a retractable stop pin 23 at the rabbet of the mounting groove 211. The telescopic movement of the stop pin 23 can be driven by an air cylinder. A rotatable rotary sleeve 221 are connected to both ends of the unwinding shaft 22. After the rotary sleeves 221 at both ends of the unwinding shaft 22 are respectively placed in the two mounting grooves 211, the stop pin 23 protrudes into the rabbet of the mounting groove 211 so as to stop the rotary sleeve at the end of the unwinding shaft 22 in the mounting groove 211 to realize the mounting of the unwinding shaft 22, thereby enabling the unwinding shaft 22 to be suspended in the unwinding frame 21 so as to support the parent roll.

Further, the unwinding frame 21 further includes a lifting shaft rod 24 and a lifting shaft air cylinder 25. A lifting shaft rod 24 and a lifting shaft air cylinder 25 are provided at both sides of the unwinding frame 21. A lower end of the lifting shaft rod 24 is connected for swinging under the unwinding frame 21, and a lifting shaft groove 241 is provided at a side of the lifting shaft rod 24 facing inside the unwinding frame 21. The end of the lifting shaft air cylinder 25 is connected for rotation in the unwinding frame 21, and the end of the telescopic rod of the lifting shaft air cylinder 25 is pivotally connected to a portion of the lifting shaft rod 24 near the middle, so that the lifting shaft air cylinder 25 telescopes and drives the lifting shaft rod 24 to swing up and down. After the unwinding shaft 22 is sleeved with the parent roll, both ends of the unwinding shaft 22 are respectively placed in the lifting shaft grooves 241 of the two lifting shaft rods 24, so that the unwinding shaft 22 is hooked by the lifting shaft grooves 241, and then the lifting shaft air cylinder 25 is controlled to swing upwards, thereby driving the unwinding shaft 22 hooked by the lifting shaft grooves 241 to move upwards to penetrate into the mounting groove 211. The manner in which the lifting shaft rod 24 and the lifting shaft air cylinder 25 cooperate to mount the unwinding shaft 22 is easier and less labor-intensive than the manner in which the unwinding shaft 22 sleeved with the parent roll is manually lifted to the mounting groove 211, thereby greatly reducing the operating intensity of a worker.

In addition, a first gear driven by a motor is provided outside one side of the unwinding frame 21, and a second gear is fixed to one end of the unwinding shaft 22. The second gear is meshed with the first gear after the unwinding shaft 22 is inserted into the mounting groove 211. In this structure, after the unwinding shaft 22 is placed in the mounting groove 211, the first gear is driven to rotate by the motor, i.e., the unwinding shaft 22 is driven to rotate by the transmission of the second gear, so that the unwinding shaft 22 rotates to drive the parent roll to rotate for releasing the adhesive paper.

Preferably, the present invention is further configured with a control system, which may be a PLC controller, for each motor and cylinder operation. Before the work, the overall diameter of the parent roll can be manually measured and input to the control system. The control system calculates the total length of the adhesive paper of the parent roll. When the parent roll releases the adhesive paper, the control system calculates the remaining length of the adhesive paper after being pulled out according to the number of rotation turns, until the adhesive paper is left to be 200 mm, the control system sends a signal to a beep alarm, so as to remind the staff to prepare to change the roll. The tail part of the front parent roll rests on the platform and presses the front adhesive roller, so that the paper cannot move. Then the front end of the rear parent roll is manually pulled to the upper surface of the platform and presses the rear adhesive roller. After the adhesive paper is firmly attached, the front and rear adhesive rollers are released. The adhesive paper is then pulled into the slitting region 11 of the machine frame 1 at a designated location.

As shown in FIGS. 4, 6, 8 and 9, the slitting device 3 includes an upper circular cutter 31 and a lower circular cutter 32. The upper circular cutter 31 and the lower circular cutter 32 are both provided in the slitting region 11, and the upper circular cutter 31 is connected to the machine frame 1 via a first limiting mechanism, and the lower circular cutter 32 is connected to the machine frame 1 via a second limiting mechanism. The upper circular cutter 31 is sleeved and fixed with a plurality of slitting cutters 311, and a third gear is fixed at one end of the upper circular cutter 31. After the upper circular cutter 31 and the lower circular cutter 32 can be connected to the slitting region 11 of the machine frame 1, the slitting cutters 311 and the lower circular cutter 32 are tangent to each other. The wide-width adhesive paper pulled out from the parent roll passes between the slitting cutters 311 and the lower circular cutter 32 to be cut by each slitting cutter 311 to form a plurality of narrow-width adhesive papers.

Figure 9:
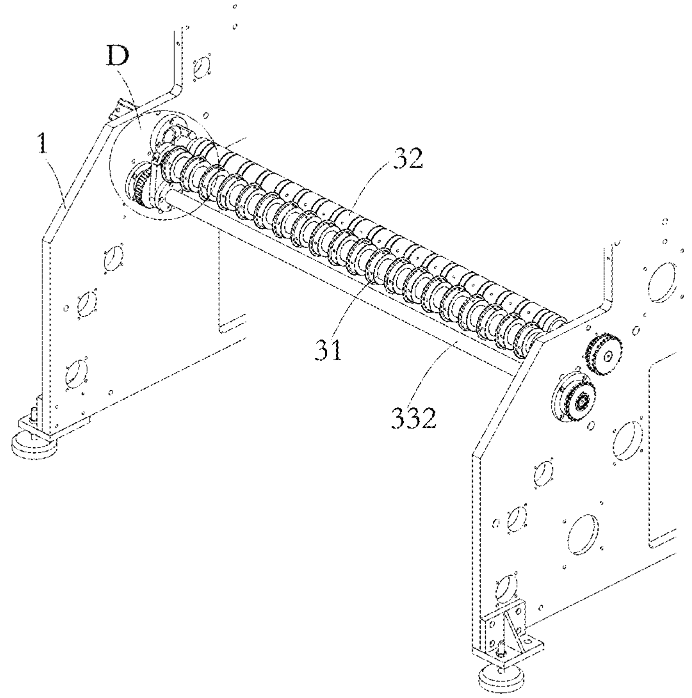
FIG. 9 is a schematic perspective view of a slitting device connected to the machine frame.

With continued reference to FIG. 9, the first limiting mechanism includes a fixing seat 331, a transmission shaft 332 and a pressing sleeve 333. The machine frame 1 mounts the fixing seat 331 on both sides of the slitting region 11. Two ends of the transmission shaft 332 respectively pass through the two fixing seats 331, so that the transmission shaft 332 is limited to rotate below between the two fixing seats 331. One end of the transmission shaft 332 also fixes a fourth gear, and the fourth gear is driven by a motor. A concave arc-shaped groove (not shown in the drawings) is provided above the fixing seat 331, and a detachable pressing sleeve 333 is connected above the fixing seat 331. A bearing is fixed at both ends of the upper circular cutter 31. When the upper circular cutter 31 is mounted, the bearings at the both ends of the upper circular cutter 31 are respectively inserted into the arc-shaped grooves of the two fixing seats 331, and then the pressing sleeve 333 is fixed to the fixing seats 331, so that the pressing sleeve 333 presses and fixes the bearings at the end of the upper circular cutter 31 on the arc-shaped grooves, and the third gear and the fourth gear at the end of the upper circular cutter 31 are automatically meshed. The fourth gear is driven to rotate by the motor, i.e., the upper circular cutter 31 is driven to rotate by the transmission of the third gear, so as to realize the rotation of the slitting cutter 311, so that the wide-width adhesive paper pulled out from the parent roll is slit to form a plurality of narrow-width adhesive papers. It can be seen therefrom that in the first limiting mechanism, the upper circular cutter 31 may be conveniently assembled and disassembled by assembling and disassembling the pressing sleeve 333.

Figure 10:
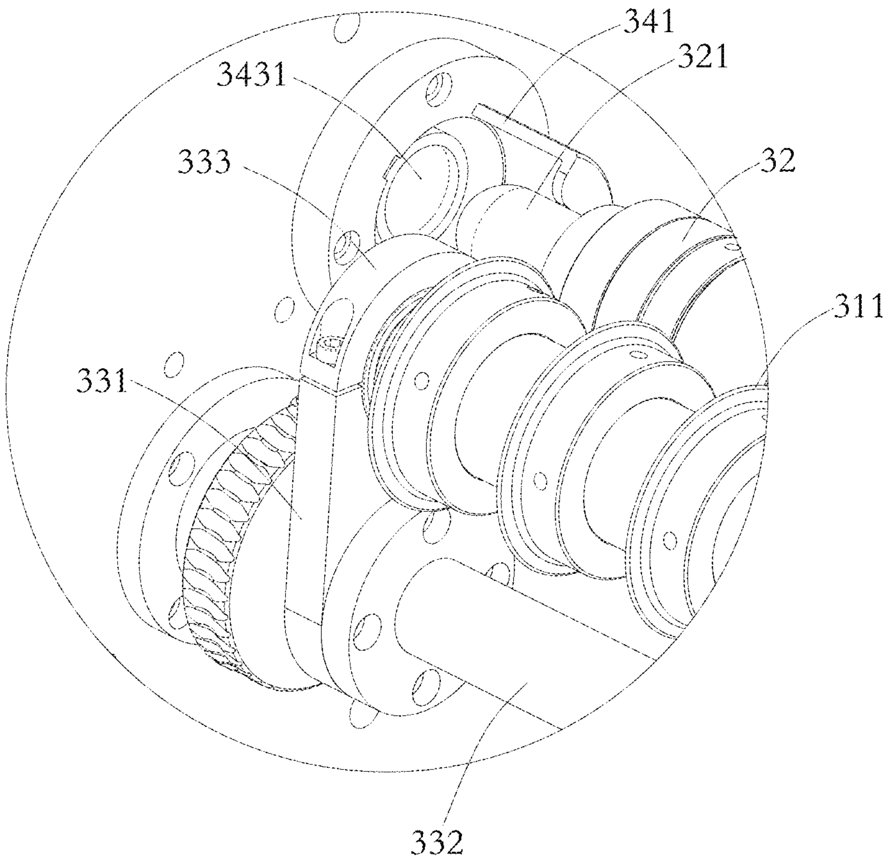
FIG. 10 is an enlarged schematic view at D in FIG. 9.
Figure 11:
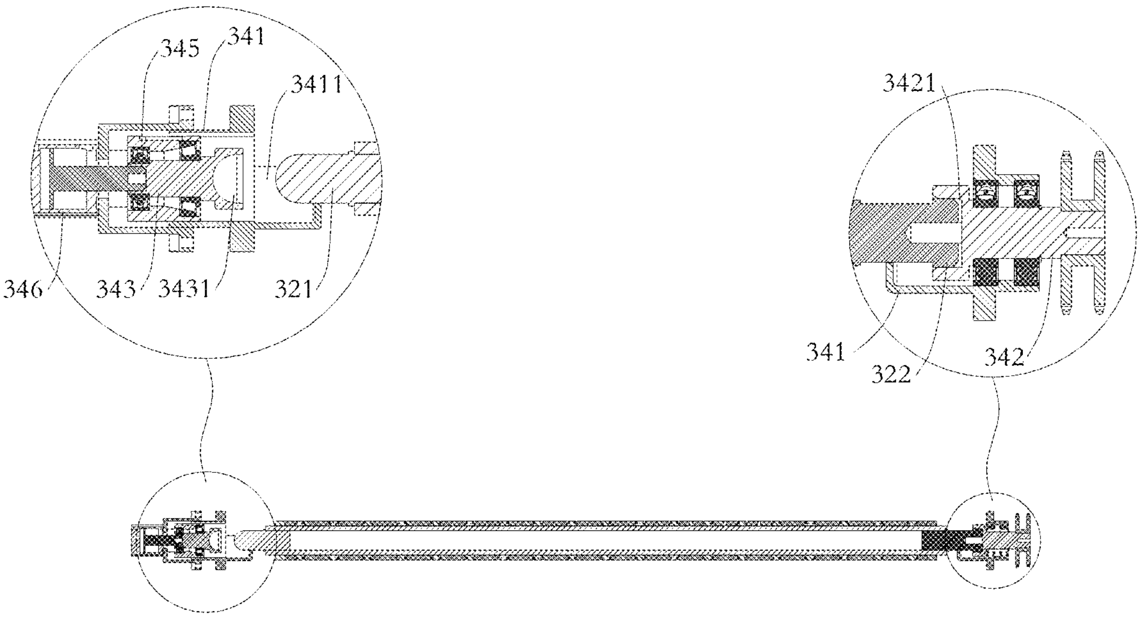
FIG. 11 is a schematic cross-sectional view of a second limiting mechanism connected to a lower circular cutter.
Figure 12:
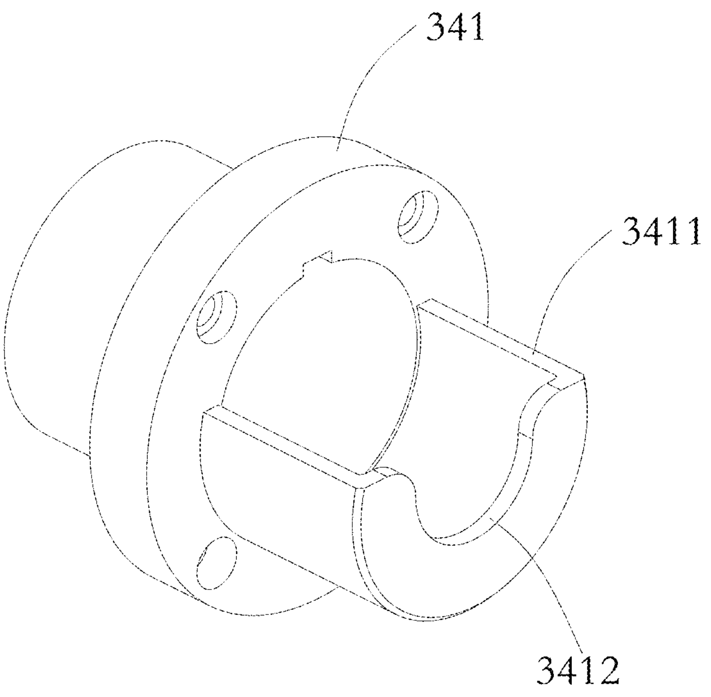
FIG. 12 is a schematic perspective view of a placement sleeve.

As shown in FIGS. 10 and 11, a positioning portion 321 and a second spline 322 are provided at both ends of the lower circular cutter 32, respectively. The slitting device 3 further includes a second limiting mechanism. The second limiting mechanism includes a placement sleeve 341, a driving sleeve 342 and a positioning sleeve 343. The machine frame 1 fixes the placement sleeve 341 on both sides of the slitting region 11. With reference to FIG. 12, a bearing part 3411 is provided at an end of the placement sleeve 341 facing towards the center of the slitting region 11. The bearing part 3411 is provided with an arc-shaped placement opening 3412 at the axial center of the placement sleeve 341. Two placement openings 3412 are respectively placed at two ends of the lower circular cutter 32, so that the bearing parts 3411 of the two placement sleeves 341 support the two ends of the lower circular cutter 32. A driving sleeve 342 is also embedded in one of the placement sleeves 341. A spline groove 3421 is provided at an end face of one end of the driving sleeve 342 inside the placement sleeve 341. One end of the driving sleeve 342 outside the placement sleeve 341 is connected to an output shaft of the motor via a chain transmission, so that the motor can drive the driving sleeve 342 to rotate.

The other placement sleeve 341 is connected to a positioning sleeve 343. A positioning groove 3431 is provided at an end of the positioning sleeve 343 in the placement sleeve 341. In operation, the positioning sleeve 343 moves to position a positioning portion 321 at one end of the lower circular cutter 32 in the positioning groove 3431, and then the positioning sleeve 343 continues to move so as to push the second spline 322 at the other end of the lower circular cutter 32 into the spline groove 3421 of the driving sleeve 342. Further, the second limiting mechanism further includes a tensioning sleeve 345 and a tensioning cylinder 346. The tensioning sleeve 345 is adapted to be embedded in the placement sleeve 341 for telescopic movement. The tensioning sleeve 345 is embedded in a bearing, and the positioning sleeve 343 penetrates into and is fixed to an inner bearing ring in the tensioning sleeve 345. The tensioning cylinder 346 has a piston rod. In particular, the tensioning cylinder 346 may be an air cylinder or an electric push rod. The tensioning cylinder 346 is fixed to the outside of the placement sleeve 341 or the machine frame 1. The end portion of the piston rod of the tensioning cylinder 346 is fixed to the tensioning sleeve 345, and the tensioning sleeve 345 can be driven to move by the movement of the telescopic rod of the tensioning cylinder 346, so as to drive the positioning sleeve 343 to move and push the lower circular cutter 32 to move into the spline groove 3421 of the driving sleeve 342. This attachment of the positioning sleeve 343 within the tensioning sleeve 345 allows the positioning sleeve 343 to rotate relative to the tensioning sleeve 345 without affecting the operative rotation of the lower circular cutter 32.

Figure 13:
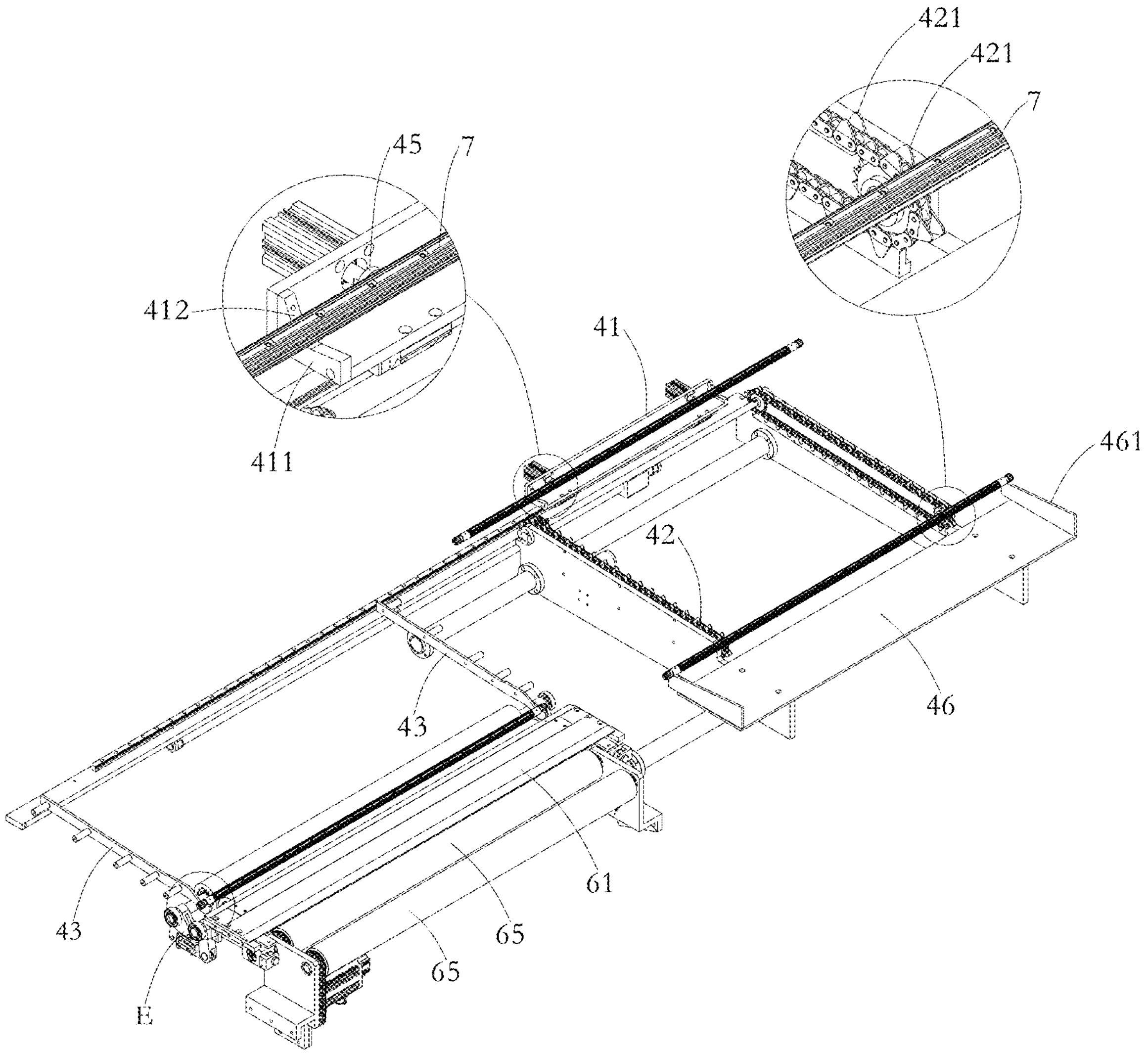
FIG. 13 is a schematic perspective view of a shaft return device.

The shaft return device 4 is used for automatically moving the winding shaft 7 from the shaft release region 12 to a designated position in the slitting region 11. As shown in FIG. 13, the shaft return device 4 includes a transverse moving seat 41, a shaft return chain 42, a guide rod 43, a push plate 44, and a shaft return frame 46. Herein, the transverse moving seat 41 moves linearly with respect to the slitting region 11 and the shaft release region 12. In particular, a first sliding rail can be fixed at the front end of the machine frame 1. The first sliding rail is located between the shaft release region 12 and the slitting region 11. A first sliding block is fixed at the bottom of the transverse moving seat 41. The first sliding block is adapted to slide on the first sliding rail. A transverse moving air cylinder is also fixed in the machine frame 1, and a piston rod of the transverse moving air cylinder is fixed to the transverse moving seat 41. The controlling the movement of the transverse moving seat 41 along the first sliding rail with respect to the shaft release region 12 and the slitting region 11 can be achieved by telescopic movement of the piston rod of the transverse moving air cylinder.

A bearing plate 411 is fix at both ends of the transverse moving seat 41, and the bearing plate 411 is provided with a bearing groove 412. A shaft return chain 42 is provided on both sides of the shaft release region 12, and chain wheels at the same end of the two shaft return chains 42 can be connected to the same rotating shaft, so that the two shaft return chains 42 run synchronously and in the same direction. When the transverse moving seat 41 is moved to the shaft release region 12, the edge of the transverse moving seat 41 is below one end of the engaged shaft return chain 42 and the height of the edge of the transverse moving seat 41 is lower than the upper portion of the shaft return chain 42. A limiting member 421 is fixed at intervals of several links in the shaft return chain 42. Two ends of the winding shaft 7 are respectively placed between two adjacent limiting members 421 corresponding to the two shaft return chains 42, so that the winding shaft 7 moves with the operation of the shaft return chains 42. When the limiting member 421 moves to the chain wheel of the shaft return chains 42 and rotates downwards, the winding shaft 7 can then fall from the shaft return chains 42 into the bearing groove 412 of the transverse moving seat 41, and then the winding shaft 7 can be driven to move to the front end of the slitting region 11 by moving the transverse moving seat 41 to the slitting region 11.

With continuing reference to FIG. 12, the shaft return frame 46 is fixed to the shaft release region 12 of the machine frame 1, and plates 461 are provided at both sides of the shaft return frame 46. The upper ends of the two placement plates 461 are provided with inclined planes which are inclined downwards and towards the shaft return chain 42. The winding shaft 7 is placed on the two placement plates 461 of the shaft return frame 46, so that a plurality of winding shafts 7 are successively arranged downwards on the placement plates 461 of the shaft return frame 46. In addition, the two placement plates 461 extend to the axis of the chain wheel of the shaft return chain 42, and the two shaft return chains 42 are provided in the range between the two placement plates 461, so that when the limiting member 421 of the shaft return chain 42 is moved close to the chain wheel of the placement plate 461 to rotate upwards, the limiting member 421 lifts the winding shaft 7 located at the front end of the placement plate 461. That is, when the shaft return chain 42 travels until the limiting member 421 moves to the chain wheel to rotate upwards, the limiting member 421 can take up the winding shaft 7 aligned at the foremost end of the shaft return chain 42, and move the winding shaft 7 in the direction of the transverse moving seat 41 to fall into the bearing groove 412 of the transverse moving seat 41.

Figure 14:
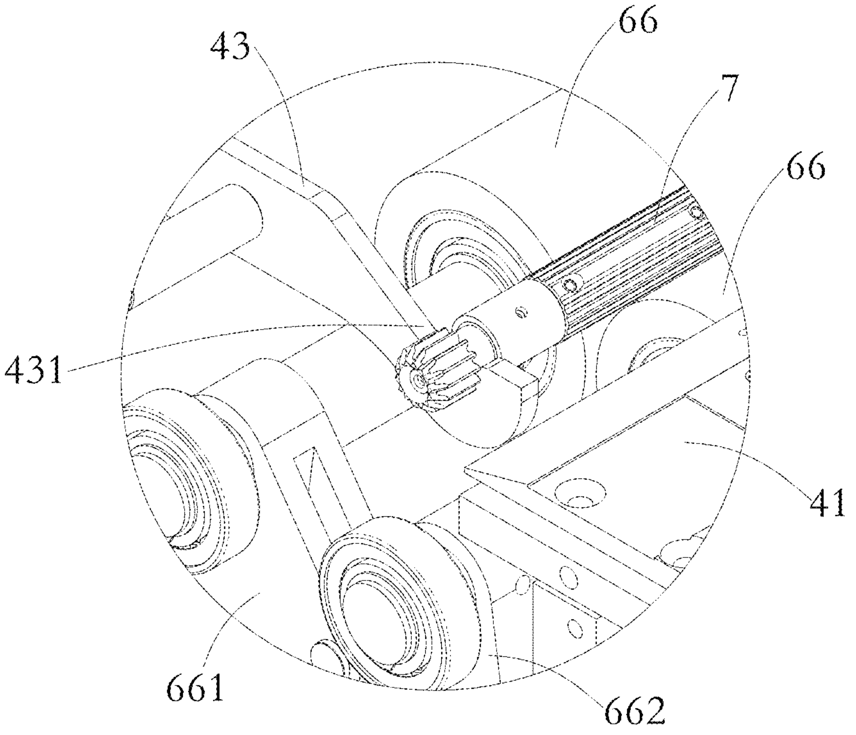
FIG. 14 is an enlarged schematic view at E in FIG. 13.

With reference again to FIG. 14, a guide rod 43 is fixed on both sides of the slitting region 11, the guide rod 43 is provided in an inclined manner, and the upper end of the guide rod 43 moves in engagement under the front end edge of the transverse moving seat 41 behind the slitting region 11. The lower end of the guide rod 43 extends into the slitting region. The upper surface of the guide rod 43 close to the lower end in the slitting region 11 is recessed downwards to form a limiting groove 431. The transverse moving seat 41 is provided with a pushing member 45 between the two bearing plates 411, and the pushing member 45 moves relative to the transverse moving seat 41. Specifically, an air cylinder can be fixed on a side of the transverse moving seat 41 facing away from the machine frame 1, and the pushing member 45 is driven to move by the air cylinder. After the transverse moving seat 41 moves to the slitting region 11, the pushing member 45 moves to push out the winding shaft 7 supported by the bearing groove 412 to the guide rod 43, so that the winding shaft 7 slides down the guide rod 43 to the rotating shafts at the two ends thereof and are respectively sunk into the limiting grooves 431 of the two guide rods 43, so as to wind the adhesive paper.

The push plate 44 is disposed above between the two guide rods 43, and the push plate 44 moves horizontally with respect to the limiting groove 431 of the guide rod 43 driven by the air cylinder. After the adhesive paper winding is completed by the winding shaft 7, the push plate 44 can push the winding shaft 7 and the adhesive paper which have completed the adhesive paper winding out of the limiting groove 431 by controlling the push plate 44 to move in the direction of the limiting groove 431.

Figure 15:
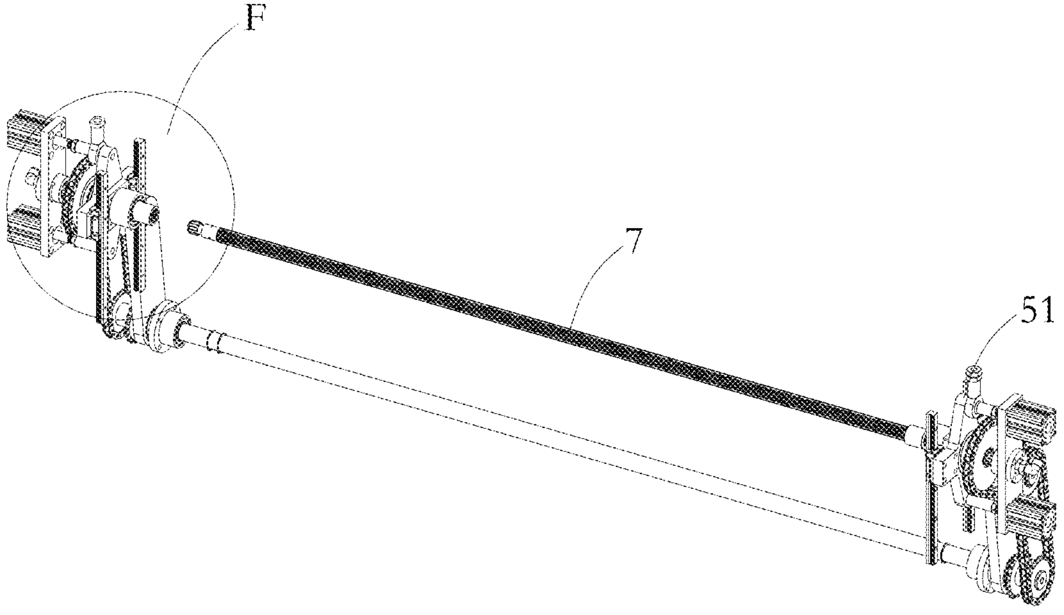
FIG. 15 is a schematic perspective view of a transmission connected to a winding shaft.
Figure 16:
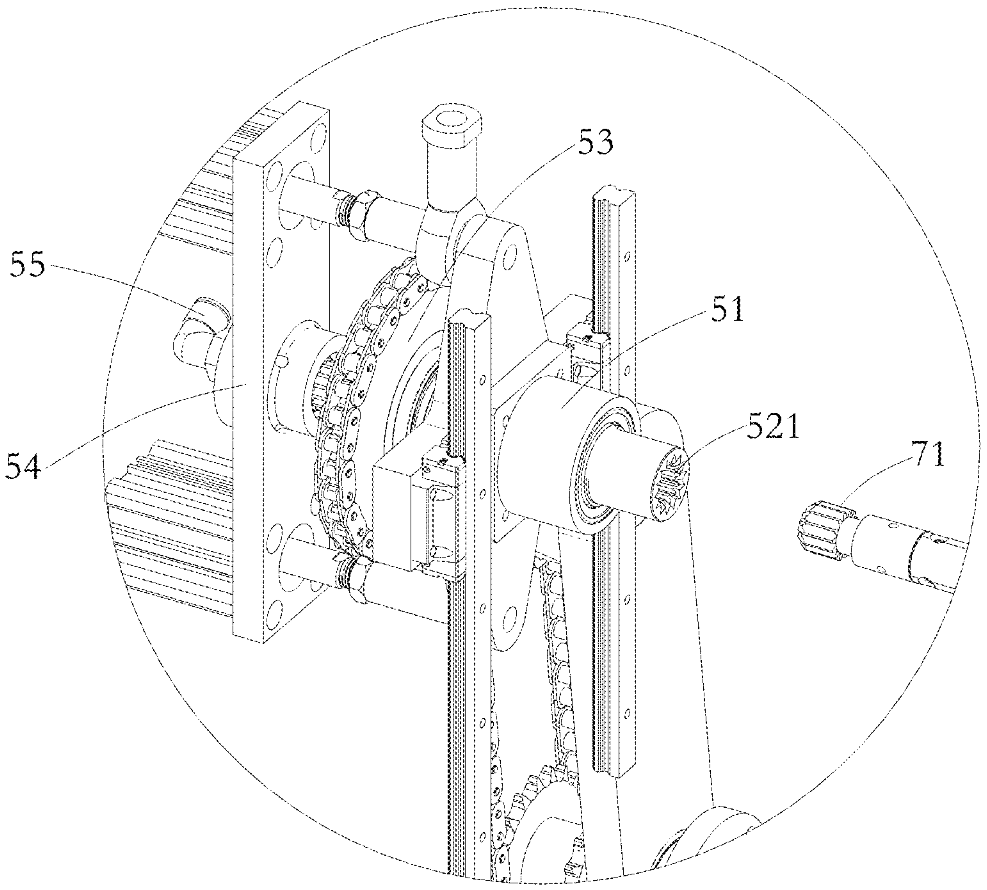
FIG. 16 is an enlarged schematic view at F in FIG. 15.

As shown in FIGS. 15 and 16, the transmission device 5 includes a moving seat 51 and a driving shaft 52 that is connected to the moving seat 51 and rotates relative to the moving seat 51. The shaft center of the driving shaft 52 is provided with a spline hole 521, and the side of the moving seat 51 located in the slitting region 11 moves relative to the limiting groove 431 of the guide rod 43. When a winding shaft 7 slides down to the limiting groove 431 of the guide rod 43, the moving seat 51 moves to drive the driving shaft 52 to the outside of the spline hole 521 of the first spline 71 fitted to the end of the winding shaft 7. In addition, a rotatable driven chain wheel 53 is also connected to a side of the machine frame 1 facing away from the middle of the slitting region 11. The outer surface of the driving shaft 52 is provided with a third spline. The center of the driven gear 53 is likewise provided with a spline hole. The third spline of the driving shaft 52 fits through the spline hole of the driven gear, so that the driving shaft 52 is radially fixed with respect to the driven chain wheel 53, namely, the driving shaft 52 is driven to rotate synchronously by the rotation of the driven chain wheel 53, and the driving shaft 52 moves with respect to the axis of the rotation shaft of the driven chain wheel 53. A driving chain wheel driven by a motor is further provided on a side of the machine frame 1. The driving chain wheel and the driven chain wheel 53 are connected via a chain transmission, so that the motor can drive the driven chain wheel 53 to rotate and drive the driving shaft 52 to rotate, thereby driving the winding shaft 7 with the first spline 71 at the end inserted into the spline hole 521 to rotate, and enabling the winding shaft 7 to wind the cut adhesive paper.

In addition, the transmission device further includes a connecting seat 54 connected to the moving seat 51. The connecting seat 54 is provided with a perforative mounting hole, with one end of the mounting hole being fitted with a bearing, and the other end of the mounting hole being fixed with a gas receiving pipe 55. The center of the driving shaft 52 is provided with an air inlet passage (not shown in the drawings) extending through both ends, and one end of the driving shaft 52 facing away from the spline hole is connected to a bearing inner ring embedded in the connecting seat 54. One end of the air inlet pipe 55 in the connecting seat 54 penetrates into the air inlet passage of the driving shaft 52, and the other end of the air inlet pipe 55 is connected to an air source, such as an air compressor, outside the connecting seat 54. After the first spline 71 of the winding shaft 7 is inserted into the spline hole 521 of the driving shaft 52, the air inlet of the winding shaft 7 and the intake passage of the driving shaft 52 are communicated, and the air source is inputted into the winding shaft 7 from the gas receiving pipe 55, so that the surface of the winding shaft 7 is expanded.

As shown in FIGS. 4 to 8, the winding device 6 includes a flat insert plate 61, a breaking blade 62, an inclined insert plate 63, a water spraying mechanism 64, a doubling roller 65, a bearing roller 66, and a pressure roller 67. The bearing roller 66 is provided on both sides of the machine frame 1 below the limiting groove 431. After the winding shaft 7 slides down along the guide rod 43 until the rotating shafts at the two ends thereof are respectively sunk into the limiting grooves 431 of the two guide rods 43, the winding shaft 7 is simultaneously located above the two bearing rollers 66, so that the winding shaft 7 performs the winding work of the narrow-width adhesive paper between the two bearing rollers 66.

Referring back to FIGS. 5 and 13, a first swing member 661 and a second swing member 662 are connected to both ends of the bearing roller 66, respectively, so that the two bearing rollers 66 are restricted from rotating between the two first swing members 661 and the two second swing members 662, respectively. The first swing member 661 and the second swing member 662 are pivoted to each other at an intermediate position, and the lower end between the first swing member 661 and the second swing member 662 is also connected to an expansion cylinder 663, the air cylinder tail end of which is pivoted to the first swing member 661, and the piston rod end of which is pivoted to the second swing member 662. In this structure, the upper end of the first swinging member 661 and the upper end of the second swinging member 662 are driven to swing by the expansion and contraction of the piston rod of the expansion cylinder 663, so as to change the distance between the two bearing rollers 66. Specifically, during the winding of the narrow-width adhesive paper after slitting, as the winding shaft 7 rotates, the diameter of the adhesive paper after winding gradually increases, and the piston rod of the expansion cylinder 663 gradually protrudes, so that the distance between the two bearing rollers 66 gradually increases, so that the adhesive paper can be always pressed by the winding shaft 7 and the bearing rollers 66. Thus, the adhesive paper during winding can be densely wound, avoiding the generation of air bubbles.

A pressing roller 67 is provided above the limiting groove 431 of the guide rod 43, and the pressing roller 67 is also driven by an air cylinder to lift and lower with respect to the winding shaft 7 located on the limiting groove 431 so as to press the adhesive paper during winding. Specifically, in the winding process of the slit narrow-width adhesive paper, the pressing roller 67 presses against the wound narrow-width adhesive paper. As the winding shaft 7 rotates, the diameter of the wound narrow-width adhesive paper gradually increases, and the pressing roller 67 gradually rises, so that the wound adhesive paper can always be pressed against the winding shaft 7 by the pressing roller 67. Thus, the adhesive paper in the winding process can be densely wound, avoiding the generation of air bubbles.

Figure 7:
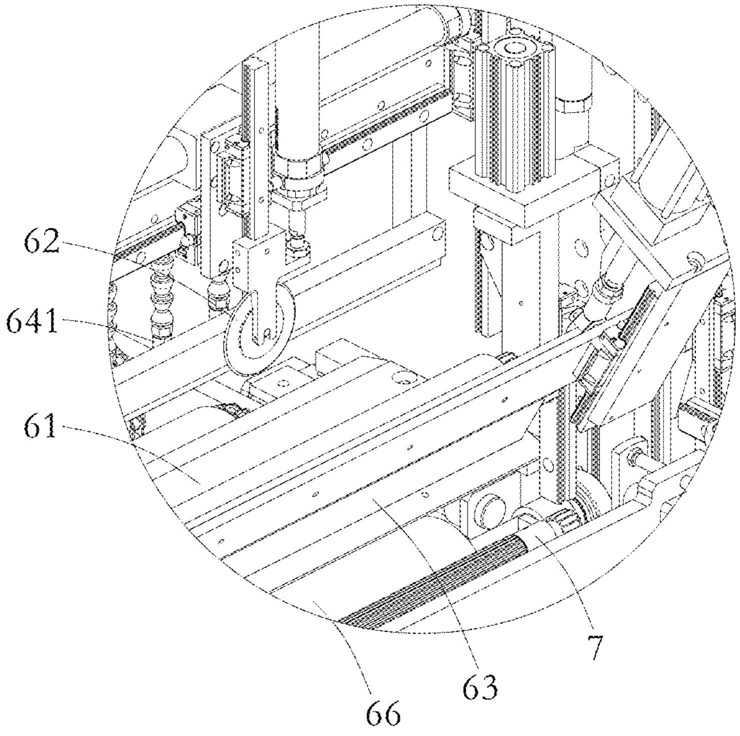
FIG. 7 is an enlarged schematic view at C in FIG. 6.
Figure 8:
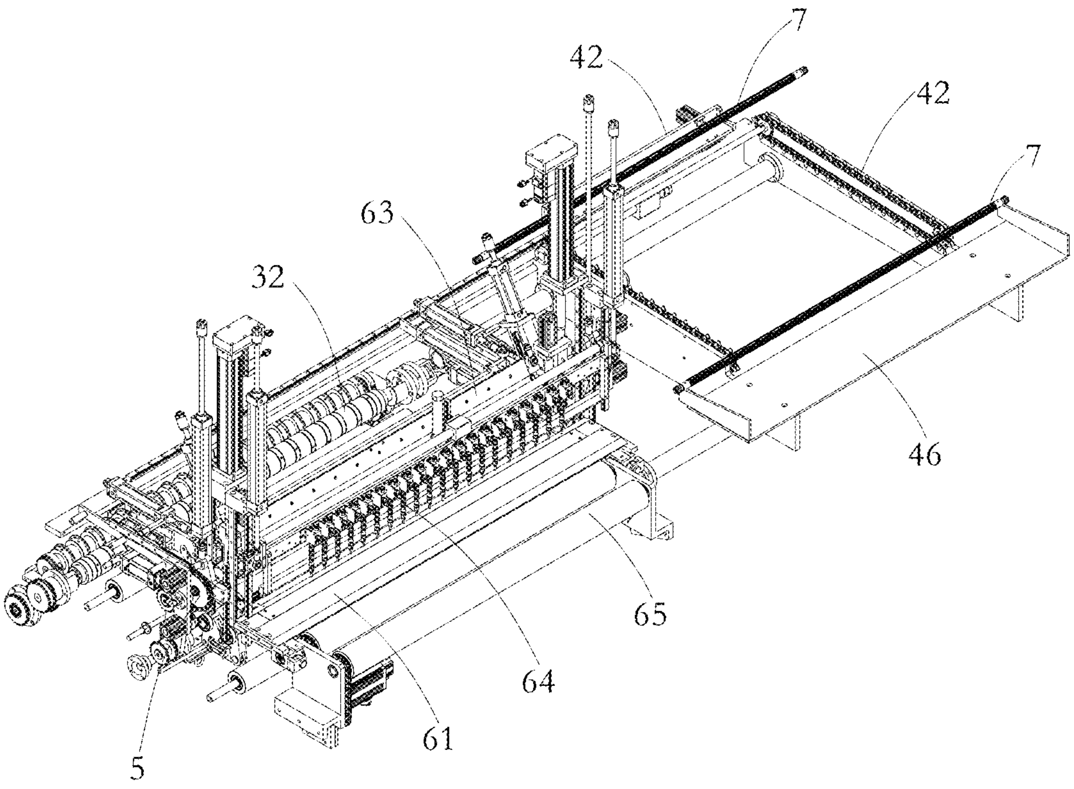
FIG. 8 is a perspective view showing a rear end of the slitting region.

The flat insert plate 61 is close to the lower end of the guide rod 43. The machine frame 1 is provided with an air cylinder for driving the movement of the flat insert plate 61 on both sides of the slitting region 11, so as to drive the flat insert plate 61 to move horizontally above the limiting groove 431 of the guide rod 43. Before the winding shaft 7 is pushed out to the limiting groove 431 of the guide rod 43, the narrow-width adhesive paper is pulled out to the flat insert plate 61 via the two bearing rollers 66. The breaking blade 62 is located above the flat insert plate 61 after being reset, and the breaking blade 62 moves vertically and parallelly with respect to the flat insert plate 61. Specifically, as shown in FIGS. 6 and 7, a second sliding rail is fixed on the machine frame 1. The second sliding rail is adapted and slidably connected to a second sliding block which is fixed to a breaking seat. The breaking seat is driven by an air cylinder to move with respect to the second sliding rail. The breaking seat is fixed to an air cylinder. A piston rod of the air cylinder is fixed to a lifting seat so as to drive the lifting seat to move up and down with respect to the flat insert plate 61, and the breaking blade 62 is connected to the lifting seat for rotating underthere. During the working, by means of the above-mentioned two air cylinders respectively driving the lifting seat to move vertically relative to the flat insert plate 61 and driving the breaking seat to move parallelly relative to the flat insert plate 61, the breaking blade 62 can be controlled to firstly descend to press against the adhesive paper located on the flat insert plate 61 and then move parallelly to cut the adhesive paper.

The inclined insert plate 63 is disposed obliquely above the limiting groove 431, and the inclined insert plate 63 moves obliquely relative to the limiting groove 431 under the driving of the air cylinder. After the adhesive paper is pulled out to pass through the two bearing rollers 66 to the flat insert plate 61, the pressing roller descends to press the adhesive paper on the winding shaft 7, so that the winding shaft 7 presses the adhesive paper on the two bearing rollers 66, then the breaking blade 62 descends and moves laterally to automatically cut the adhesive paper laterally. After cutting, the pressing roller rises, and the flat insert plate 61 moves to the winding shaft 7, so that the adhesive paper above the flat insert plate 61 moves back above the winding shaft 7 to wrap the winding shaft 7. Then, the inclined inserting plate 63 descends to insert into the gap between the winding shaft 7 and the end of the adhesive paper, then the pressing roller depresses again, and the winding shaft 7 rotates to take up the adhesive paper.

Two doubling rollers 65 are provided at the ends of the slitting region 11. The two ends of the two doubling rollers 65 are restricted to rotate relative to the machine frame 1. It is used between the two doubling rollers 65 for receiving the winding shaft 7 after the adhesive paper is wound. The water spraying mechanism 64 includes a cross rod and a row of spray heads 641 provided on the cross rod. The spray openings of the spray heads 641 face downwards. The cross rod is provided between the doubling roller 65 and the limiting groove 431, and the cross rod moves vertically relative to the machine frame 1. When the winding shaft 7 completes the winding of the adhesive paper, the push plate 44 of the shaft return device 4 pushes the winding shaft 7 out of the limiting groove 431, so that the winding shaft 7 for winding the adhesive paper is pushed out through the flat insert plate 61 and then moves onto the two doubling rollers 65. Then, the breaking blade 62 cuts the adhesive paper on the flat insert plate 61, so that the adhesive paper is divided into two on the flat insert plate 61, wherein one part is located at a part extending to the doubling roller 65 to complete the winding, and the other part is equivalent to a part to be wound from the parent roll pulled out onto the flat insert plate 61. At the same time, the spray head 641 automatically sprays water onto the paper surface coated with the wet water adhesive in the narrow-width adhesive paper, and finally the doubling roller 65 automatically rotates under the drive of the motor to wind the cut paper end to be laminated with the paper roll.

With the above configuration, the slitting machine of the present invention works as follows:

s1, the wide-width adhesive paper in the parent roll of the unwinding device 2 is drawn out into the slitting region 11 of the machine frame and passes between the upper circular cutter 31 and the lower circular cutter 32 of the slitting device;

s2, the slitting cutter 311 of the upper circular cutter 31 in the slitting device slits the wide-width adhesive paper to form a plurality of narrow-width adhesive papers, and the narrow-width adhesive papers are conveyed to the flat insert plate 61 of the winding device 6 and pass under the winding shaft 7 placed on the limiting groove 431 of the guide rod 43;

s3, the flat insert plate 61 is moved onto the winding shaft 7, the adhesive paper above the flat insert plate 61 is moved back above the winding shaft 7 to wrap the winding shaft 7; then the flat insert plate 61 is reset, and the inclined insert plate 63 is lowered to be inserted into a gap between the winding shaft 7 and the end of the adhesive paper; and also, the pressing roller 67 descends, so that the adhesive paper is pressed above the pressing roller 67 and the winding shaft 7, below the winding shaft 7 and between the two bearing rollers 66;

s4, the driving shaft 52 is moved until the spline groove 3421 is adapted to fit outside the first spline 71 of the winding shaft 7, so that the driving shaft 52 rotates to drive the winding shaft 7 to rotate, and also, the unwinding shaft 22 also rotates; the unwinding shaft 22 releases the adhesive paper from the parent roll, and the winding shaft 7 winds the adhesive paper on the outside thereof to form a paper roll;

s5, after completing the winding of the winding shaft 7, the pressing roller rises, and the push plate 44 pushes out the winding shaft 7 from the limiting groove 431 of the guide rod 43, so that the winding shaft 7 passes through the flat insert plate 61 to roll onto a space between the two doubling rollers 65, and pulls the adhesive paper to pass through the flat insert plate 61. Then the breaking blade 62 cuts off the adhesive paper on the flat insert plate 61, and the spray head 641 automatically sprays water onto the adhesive paper coated with the hydraulic glue. Finally, the doubling roller 65 automatically rotates under the drive of the motor, winding the cut paper head to adhere to the paper roll;

S6, the winding shaft 7 on the doubling roller 65 is taken out for releasing the air pressure in the winding shaft 7, so as to take out the paper roll adhesive tape after completed winding, and then both ends of the winding shaft 7 are respectively placed on two of the shaft return chains 42 in the shaft release region 12;

s7, the operation of the shaft return chain 42 drives the winding shaft 7 to move in the direction of the transverse moving seat 41, so that the newly placed winding shaft 7 moves forwards; at the same time, the winding shaft 7 located at the front end of the shaft return chain 42 also moves forwards to fall on the transverse moving seat 41, and then the transverse moving seat 41 moves to the slitting region 11; and the pushing member 45 of the transverse moving seat 41 pushes the winding shaft 7 to slide along the guide rod 43 and fall on the limiting groove 431, and then it is repeated from the above-mentioned s3 to form a continuous and uninterrupted adhesive paper winding work.

In addition, the slitting machine of the present invention may be provided with a set of printing devices which are provided between the unwinding frame and the slitting region of the machine frame, so that the wide-width adhesive paper pulled out from the parent roll passes through the printing devices and then enters the slitting region for slitting and winding. A first printing head and a second printing head are provided in the printing device, and the wide-width adhesive paper pulled out from the parent roll passes through the first printing head and the second printing head in sequence. It is then colour processed, then dried, and then enters the storage rack. Herein, the colour processing is realized by manually rotating a colour process handwheel, and the drying is realized by blowing air to the printing paper surface by a fan. In order to avoid the shut-down in the winding process of the narrow-width adhesive paper affecting the printing work, the winding shut-down will not affect the printing when passing through the storage rack, which ensures the printing winding work smoothly and orderly. All are done automatically by the system without manual operation.

In summary, the present invention can achieve that the adhesive paper in the parent roll is pulled into the slitting region 11 of the machine frame 1, so that the slitting device 3 located in the slitting region 11 cuts the adhesive paper pulled out from the parent roll to form a plurality of narrow-width formed adhesive paper. The formed adhesive paper is wound on the winding shaft 7 via the winding device 6 to form a required paper roll adhesive tape, and the winding shaft 7 is pushed out to remove the paper roll adhesive tape. The winding shaft 7 is placed on the two shaft return chains 42 of the shaft release region 12, and the shaft return device 4 can automatically and sequentially transfer the winding shaft 7 into the slitting region 11 to sequentially perform the work of adhesive paper winding. The process of transferring the winding shaft 7 from the shaft release region 12 to the slitting region 11 and carrying out the adhesive tape winding does not require a manual operation, so that the automatic slitting and automatic winding of the adhesive paper can be achieved, which is beneficial to save the labor cost of tape production and improve work efficiency.

While the foregoing is directed to embodiments of the present invention, the design idea of the invention is not limited to this. Any use of this idea to make non-substantive changes to the invention shall be an infringement of the scope of protection of the invention.

What is claimed is:

1. An automatic slitting machine, wherein the slitting machine comprises a machine frame, an unwinding device, a slitting device, a shaft return device, a transmission device and a winding device;

wherein the unwinding device comprises an unwinding frame and an unwinding shaft; the unwinding shaft is mounted on the unwinding frame, and the unwinding shaft is configured for mounting a parent roll; the rotation of the unwinding shaft drives the parent roll to release adhesive paper;

the slitting device comprises an upper circular cutter and a lower circular cutter; one side of the machine frame is a slitting region, the upper circular cutter and the lower circular cutter are both provided in the slitting region; the upper circular cutter sheathes and fixes a plurality of slitting cutters; the slitting cutters are tangent to the lower circular cutter, and the adhesive paper passes between the slitting cutter and the lower circular cutter;

the shaft return device comprises a transverse moving seat, a shaft return chain, a guide rod and a push plate, wherein one side of the machine frame is a shaft release region; the transverse moving seat moves linearly with respect to the shaft release region and the slitting region; the shaft return chain moving synchronously and in the same direction is provided at both sides of the shaft release region; an edge of the transverse moving seat is engaged with the shaft return chain, and the height of the transverse moving seat is lower than an upper part of the shaft return chain; a limiting member is fixed in the shaft return chain by several links; two ends of a winding shaft are respectively placed between two adjacent limiting members corresponding to two of the shaft return chains, moving the winding shaft to the transverse moving seat with the running of the shaft return chain; the guide rods are fixed on both sides of the slitting region; the guide rod is provided in an inclined manner, and the upper end of the guide rod is engaged with the edge of the transverse moving seat; the lower end of the guide rod is recessed downwards to form a limiting groove; the winding shaft in the transverse moving seat sliding down the guide rod to the rotating shaft at the two ends thereof is respectively caught in the limiting groove of the two guide rods, and the push plate moves relative to the limiting groove to push out the winding shaft located in the limiting groove;

the transmission device comprises a moving seat and a driving shaft; the driving shaft is connected to the moving seat, and the driving shaft rotates relative to the moving seat; a spline hole is provided on the axis of the driving shaft; the moving seat is located on a side edge of the slitting region and moves relative to the guide rod, and moves until the spline hole is fitted outside a first spline at an end of the winding shaft;

the winding device comprises a flat insert plate, a breaking blade and an inclined insert plate, wherein the flat insert plate is close to a lower end of the guide rod, and the flat insert plate moves horizontally above the limiting groove; the breaking blade is located above the flat insert plate after being reset, and the breaking blade moves vertically and parallelly to the flat insert plate; the inclined insert plate is provided obliquely above the limiting groove; and the inclined insert plate moves along an inclination angle thereof relative to the limiting groove.

2. The automatic slitting machine according to claim 1, wherein the winding device further comprises a water spraying mechanism and a doubling roller; two of the doubling rollers are provided at the ends of the slitting region; two ends of the two doubling rollers are limited to rotate relative to the machine frame, and a winding shaft after bearing and winding the adhesive paper is located between the two doubling rollers; the water spraying mechanism comprises a cross rod and a row of spray heads provided on the cross rod; the spray nozzles of the spray heads face downwards; and the cross rod is provided between the doubling roller and the limiting groove, and the cross rod moves vertically relative to the machine frame.

3. The automatic slitting machine according to claim 1, wherein a rotatable rotary sleeve is connected to both ends of the unwinding shaft; both sides of the unwinding frame of the unwinding device are provided with a mounting groove, and the unwinding frame is provided with a retractable stop pin at a rabbet of the mounting groove; the stop pin extends into the rabbet of the mounting groove to stop the rotary sleeve at the end of the unwinding shaft in the mounting groove after the both ends of the unwinding shaft are respectively placed in two of the mounting grooves.

4. The automatic slitting machine according to claim 3, wherein a first gear driven by a motor is provided outside one side of the unwinding frame; a second gear is fixed to one end of the unwinding shaft; and the second gear is meshed with the first gear after the unwinding shaft penetrates into the mounting groove.

5. The automatic slitting machine according to claim 3, wherein the unwinding frame further comprises a lifting shaft rod and a lifting shaft air cylinder; the lifting shaft rod and the lifting shaft air cylinder are provided at both sides of the unwinding frame; a lower end of the lifting shaft rod is connected to swing under the unwinding frame; a lifting shaft groove is provided at one side of an upper end of the lifting shaft rod facing inside the unwinding frame; the lifting shaft groove is configured for hooking the unwinding shaft; an end of the lifting shaft air cylinder is connected to rotate in the unwinding frame; an end portion of a telescopic rod of the lifting shaft air cylinder and a portion of the lifting shaft rod close to the middle are pivotally connected, making the lifting shaft air cylinder extend and retract to drive the lifting shaft rod to swing up and down; and the lifting shaft air cylinder swings upwards to drive the unwinding shaft hooked by the lifting shaft groove to move upwards to penetrate into the mounting groove.

6. The automatic slitting machine according to claim 1, wherein a third gear is fixed at an end of the upper circular cutter; the slitting device further comprises a first limiting mechanism comprising a fixing seat, a transmission shaft and a pressing sleeve; the machine frame fixes the fixing seat on both sides of the slitting region; two ends of the transmission shaft respectively pass through the two of the fixing seats, so that the transmission shaft is limited to rotate below between the two fixing seats, and a fourth gear driven by an electric motor is also fixed at an end of the transmission shaft; a concave arc-shaped groove is provided above the fixing seat, and a detachable pressing sleeve is connected above the fixing seat; both ends of the upper circular cutter are fixed with bearings, and the bearings at the both ends of the upper circular cutter are respectively embedded in the arc-shaped grooves of the two fixing seats; and the pressing sleeve is fixed to the fixing seat to press and fix the bearings at the ends of the upper circular cutter on the arc-shaped grooves, so that the third gear and the fourth gear are meshed.

7. The automatic slitting machine according to claim 1, wherein both ends of the lower circular cutter are respectively provided with a positioning portion and a second spline; the slitting device further comprises a second limiting mechanism comprising a placement sleeve, a driving sleeve and a positioning sleeve; the machine frame fixes the placement sleeve on both sides of the slitting region, wherein one of the placement sleeves is embedded with the driving sleeve; a spline groove is provided at an end of the driving sleeve inside the placement sleeve; a motor is in transmission connection with an end of the driving sleeve outside the placement sleeve, the positioning sleeve is connected inside the other of the placement sleeves, and a positioning groove is provided at an end of the positioning sleeve inside the placement sleeve; an end of the placement sleeve facing towards the center of the slitting region is provided with a bearing part which is provided with an arc-shaped placement opening at the axial center of the placement sleeve; two ends of the lower circular cutter are respectively placed at the placement openings of the two placement sleeves, so that the positioning sleeve is moved until the positioning part of one end of the lower circular cutter is sheathed in the positioning groove, and the second spline at the other end of the lower circular cutter is pushed into the spline groove of the driving sleeve.

8. The automatic slitting machine according to claim 7, wherein the second limiting mechanism further comprises a tensioning sleeve and a tensioning cylinder, wherein the tensioning sleeve is adapted to be embedded in the placement sleeve for telescopic movement; the tensioning sleeve is embedded inside with a bearing; the positioning sleeve penetrates into and is fixed to an inner bearing ring inside the tensioning sleeve; the tensioning cylinder has a piston rod, and the tensioning cylinder is fixed to the outside of the placement sleeve or the machine frame; and an end portion of the piston rod of the tensioning cylinder is fixed to the tensioning sleeve, so that the tensioning cylinder drives the tensioning sleeve to move, and the positioning sleeve drives the lower circular cutter to move.

9. The automatic slitting machine according to claim 1, wherein bearing plates are fixed to both ends of the transverse moving seat, the bearing plate is provided with a bearing groove, and a winding shaft enters the bearing groove from the shaft return chain; the transverse moving seat is provided with a pushing member between two of the bearing plates; and the pushing member moves relative to the transverse moving seat to push the winding shaft supported by the bearing groove out to the guide rod.

10. A working method of the slitting machine according to claim 1, wherein the working method is as follows:

s1, the wide-width adhesive paper in the parent roll of the unwinding device is drawn out into the slitting region of the machine frame and passes between the upper circular cutter and the lower circular cutter of the slitting device;

s2, the slitting cutter of the upper circular cutter in the slitting device slits the wide-width adhesive paper to form a plurality of narrow-width adhesive papers, and the narrow-width adhesive papers are conveyed to the flat insert plate of the winding device and pass under the winding shaft placed on the limiting groove of the guide rod;

s3, the flat insert plate is moved onto the winding shaft, the narrow-width adhesive paper above the flat insert plate is moved back above the winding shaft to wrap the winding shaft; then the flat insert plate is reset, and the inclined insert plate is lowered to be inserted into a gap between the winding shaft and the end of the narrow-width adhesive paper;

s4, the driving shaft is moved until the spline groove is adapted to fit outside the first spline of the winding shaft, so that the driving shaft rotates to drive the winding shaft to rotate, and also, the unwinding shaft also rotates; the unwinding shaft releases the wide-width adhesive paper from the parent roll, and the winding shaft winds the narrow-width adhesive paper on the outside thereof to form a paper roll adhesive tape;

s5, after the winding shaft completes the winding of the narrow-width adhesive paper, the push plate pushes out the winding shaft from the limiting groove of the guide rod;

S6, the winding shaft is taken out for releasing the air pressure in the winding shaft, so as to take out the paper roll adhesive tape after completed winding, and then both ends of the winding shaft are respectively placed on two of the shaft return chains in the shaft release region;

s7, the operation of the shaft return chain drives the winding shaft to move in the direction of the transverse moving seat, so that the winding shaft located at the front end of the shaft return chain moves forwards to fall on the transverse moving seat, then the transverse moving seat moves to the slitting region, and the transverse moving seat then pushes the winding shaft to slide along the guide rod and fall on the limiting groove; and it repeats from the above-mentioned s3 to form a continuous and uninterrupted adhesive paper winding work.

* * * * *